J. A. HAFNER.

Mill-Spindle.

No. 6,492. Reissued June 22, 1875.

WITNESSES

Franck L. Durand

C. L. Evert

By

INVENTOR

John A. Hafner

Alexander Mason

Attorney

UNITED STATES PATENT OFFICE.

JOHN A. HAFNER, OF PITTSBURG, PENNSYLVANIA.

IMPROVEMENT IN MILL-SPINDLES.

Specification forming part of Letters Patent No. 146,063, dated December 30, 1873; reissue No. 6,492, dated June 22, 1875; application filed May 31, 1875.

*To all whom it may concern:*

Be it known that I, JOHN A. HAFNER, of Pittsburg, in the county of Allegheny and State of Pennsylvania, have invented certain new and useful Improvements in Mill-Spindles; and I do hereby declare that the following is a full, clear, and exact description thereof, reference being had to the accompanying drawings and to the letters of reference marked thereon, which form a part of this specification.

The nature of my invention relates to an improvement in mill-spindles; and it consists in the arrangement and combination of parts, as will be hereinafter more fully set forth.

In order to enable others skilled in the art to which my invention appertains to make and use the same, I will now proceed to describe its construction and operation, referring to the annexed drawing, in which—

Figure 1:
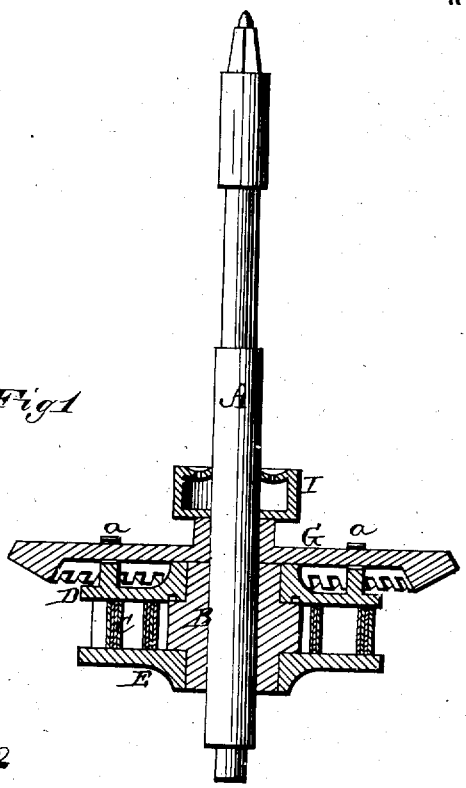
Figure 2:
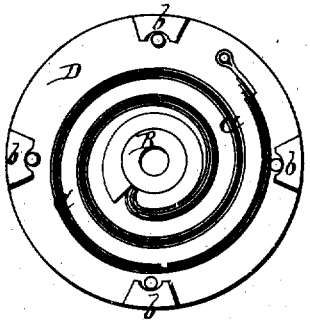
Figure 2:
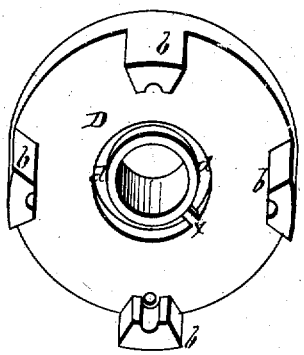
Figure 3:
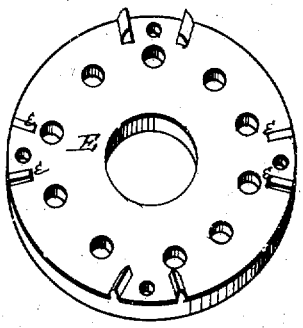
Figure 4:
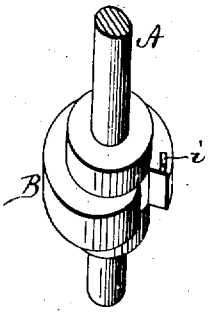

Figure 1 is a vertical section of my invention. Fig. 2 is a bottom view of the upper plate and spring. Fig. 3 is a perspective view of the lower plate. Fig. 4 is a detail view of the upper plate, with a part of the spindle and hub thereon.

A represents a mill-spindle, having keyed to its lowered end a center hub, B, to which the inner end of the spring C is fastened. This spring may be made of any suitable number of steel plates, and connects the casing with the shaft. The casing consists of two circular plates, the upper one, D, of which has two or more projections or other devices, *a*, formed upon its top, for engaging with the arms or spokes of the wheel G so as to cause them to revolve together. On the under side of this upper plate D are formed a number of projections, *b*, the lower ends of which are held in position by the small flanges *e e*, formed upon the top of the lower plate E. Around the opening through which the spindle passes in the under side of the top plate D is a groove, *d*, concentric with said opening, and in said groove is formed a stop, *x*. On the top of the center hub B is formed a lug, *i*, fitting in the groove *d* and coming in contact with the stop *x* therein, as hereinafter described. Above the top of the cog-wheel G, around the shaft, is placed an oil-chamber, I, for lubricating the various parts. As the cog-wheel G is revolved by devices connected thereto the casing D E is rotated thereby, and the spring C being connected to said casing and to the hub B, secured on the spindle A, said spindle is also revolved in the same direction as the casing.

In case of any backward movement of the gearing the lug *i* on this hub B will come against the stop *x* in the groove *d* and prevent any breakage of any part of the machinery by stopping the backward movement of the casing around the hub. The spring may be used above or below the cog-wheel, as desired.

The movement of the spindle is even and regular, and all side pressure or wear, either upon the spindle or wheel, is prevented.

This present invention is intended as an improvement upon the Letters Patent granted to me for a horse-power connection, dated February 2, 1869, and No. 86,533, and is constructed especially with a view to improve the art in the class of inventions for which it is intended for use.

Having thus fully described my invention, what I claim as new, and desire to secure by Letters Patent, is—

1. The combination of the hub B, having the lug *i*, and the plate D, provided with the groove *d*, having stop *x*, substantially as and for the purposes herein set forth.

2. The grooved plate D, having the projections *b*, in combination with the plate E, spring C, hub B, and spindle A, substantially as shown.

In testimony that I claim the foregoing I have hereunto set my hand this 25th day of May, 1875.

JNO. A. HAFNER.

Witnesses:
C. L. EVERT,
W. A. SKINKLE.